(12) United States Patent
van Eendenburg et al.

(10) Patent No.: US 6,248,388 B1
(45) Date of Patent: *Jun. 19, 2001

(54) EDIBLE LAMINATED DOUGH AND EDIBLE LAMINATION DISPERSION THEREFOR

(75) Inventors: Jacobus van Eendenburg, de Lier; Petra Weisenborn, Bilthoven; Gerrit Leendert van der Schee, Rockanje; Willem Voorbach, Vlaardingen; Janos Bodor, Rijswijk, all of (NL)

(73) Assignee: Pennant Foods Company, Lisle, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/663,766

(22) Filed: Jun. 14, 1996

(30) Foreign Application Priority Data

Jun. 15, 1995 (EP) .................................................. 95201602

(51) Int. Cl.[7] ............................. A21D 13/08; A23D 7/005
(52) U.S. Cl. ........................ 426/556; 426/576; 426/578; 426/603
(58) Field of Search ................................ 426/19, 54, 556, 426/559, 560, 496, 89, 93, 94, 297, 549, 573, 574, 576, 653, 502, 578, 602–603, 601, 604

(56) References Cited

U.S. PATENT DOCUMENTS

| | | | |
|---|---|---|---|
| 3,077,408 | 2/1963 | Rozsa et al. | 99/93 |
| 4,622,226 | * 11/1986 | Ke et al. | 426/94 |
| 4,752,494 | 6/1988 | Tang et al. | 426/523 |
| 4,762,721 | * 8/1988 | Holscher et al. | 426/94 |
| 4,956,193 | 9/1990 | Cain | 426/573 |
| 4,986,992 | * 1/1991 | Glaros et al. | 426/19 |
| 5,169,671 | 12/1992 | Harada et al. | 426/658 |
| 5,190,776 | 3/1993 | Bauman | 426/94 |
| 5,252,352 | * 10/1993 | Banach et al. | 426/580 |
| 5,384,142 | * 1/1995 | Henson | 426/496 |
| 5,403,610 | 4/1995 | Murphy | 426/549 |
| 5,554,407 | * 9/1996 | Bodor et al. | 426/603 |

FOREIGN PATENT DOCUMENTS

| | | |
|---|---|---|
| 1 442 001 | 10/1968 | (DE) . |
| 284 026 | 9/1988 | (EP) . |
| 327 120 | 8/1989 | (EP) . |
| 468 560 | 1/1992 | (EP) . |
| 509 707 | 10/1992 | (EP) . |
| 529 891 | 3/1993 | (EP) . |
| 537 126 | 4/1993 | (EP) . |
| 596 546 | 5/1994 | (EP) . |
| 605 217 | 7/1994 | (EP) . |
| 93/17564 | 9/1993 | (WO) . |
| 93/22928 | 11/1993 | (WO) . |
| 94/14887 | 7/1994 | (WO) . |
| 94/21128 | 9/1994 | (WO) . |
| 9421128 | * 9/1994 | (WO) . |
| 94/23587 | 10/1994 | (WO) . |
| 94/28741 | 12/1994 | (WO) . |
| 95/26641 | 10/1995 | (WO) . |

* cited by examiner

*Primary Examiner*—Keith Hendricks
*Assistant Examiner*—Drew Becker
(74) *Attorney, Agent, or Firm*—Foley & Lardner

(57) ABSTRACT

Edible laminated dough is made with a water continuous lamination dispersion. The lamination dispersion includes a combination of hydrocolloids. Expressed on the non-fat contents of the lamination dispersion, 0.5–40% protein hydrocolloid and 0.1–60% non-protein hydrocolloid or gelatin are included. The water content of the lamination dispersion is 15–90%, the fat content 0–80%. From the dough e.g. puff pastry, croissants and Danish pastry can be made having good structure and taste. With the laminated dough a wider range of laminated baked products can be obtained, e.g. containing less or nutritionally more attractive fat having a different taste profile. A preferred combination of hydrocolloids is aggregate gel forming maltodextrin and sodium caseinate. Another preferred lamination dispersion is based on cheese not containing melting salts.

20 Claims, No Drawings

US 6,248,388 B1

EDIBLE LAMINATED DOUGH AND EDIBLE LAMINATION DISPERSION THEREFOR

The invention relates to an edible laminated dough and to an edible lamination dispersion therefor. Lamination dispersions are dispersions used in the preparation of laminated doughs, for example for making croissants, danish pastry and other laminated pastry, especially puff pastry. The typical lamination dispersion is a fat continuous product often having a dispersed aqueous phase, e.g. pastry shortening or margarine.

According to Bailey's Industrial Oil and Fat Products vol. 3 (1985), pp 109–110, puff pastry requires the use of a very specialized shortening. The fat is placed on top of the (pré-) dough and folded and rolled to form many alternating layers of dough and fat. The shortening has a tough waxy body over a wide temperature range. It must approximate the consistency of the dough to remain in a continuous unbroken layer as it stretches and becomes thinner. Puff pastry shortening almost always contains an aqueous phase. The fat keeps the layers of dough separate and flaky, and the moisture attributes the "puff" as it turns to steam during the baking process. Commonly 90% fat shortenings or 80% fat pastry margarines are used. For the preparation of other laminated doughs, similar types of lamination shortenings and margarines are used.

Lamination dispersions that do not have a continuous fat phase are known.

U.S. Pat. No. 5,190,776 discloses a low/no fat ingredient suitable for use in producing laminated baked goods. It is prepared by mixing 40–70% cake crumbs, 9–30% sugar, 5–20% sugar syrup and 10–30% of a starch containing creme filling. The starch containing creme-filling consists of the same composition as this "low/no fat ingredient" but further includes flavouring ingredients such as flavours, spices and/or fruit material. The low/no fat ingredient has a moisture content of 2–20%, preferably 4–10%. Disadvantages of this ingredient are that it requires the availability and processing of cake crumbs and that it is very sweet. In view of the low moisture contents this ingredient will not have a continuous aqueous phase.

DOS 1442001 describes an O/W lamination dispersion. A purpose is to provide a product that can be prepared without the use of equipment required for making margarine or shortening. A further target is to avoid the use of high melting fats that can give a waxy mouthfeel to the baked product. The use of high melting fats is often required when using conventional margarine or shortening to obtain a proper consistency over a wide temperature range. The products illustrated in the examples consist of 75–82% fat, 16–21% water, 1.6–3.8% emulsifier and in some cases 0.08% carboxy methyl cellulose. The dispersion must have a firmness characterised by a minimum value for a parameter which is calculated from a given equation using data obtained with a cone-penetrometer.

EP 327 120 discloses oil-in-water type emulsions for lamination purposes ("rolling in") comprising 2–20% protein, 30–75% fat, 18–65% water and 0.1–5% phospholipid. The primary objective of EP 327120 is to reduce the fat content of the lamination dispersion, for nutritional reasons. It is essential that at least 40% preferably at least 50% of the phospholipids are mono acyl glycero phospholipids else a stable product cannot be obtained. The presence of 30% fat is required to be able to get satisfactory "rolling-in" properties. It is preferred not to include materials such as starches, gums and preservatives. The mono acyl glycero phospholipids preferably comprise substantially lyso phosphatidyl choline and may further contain lysophosphatidylethanolamine and a small amount of lyso phosphatidylinositol, lyso phosphatidic acid and lyso phosphatidylserine. A disadvantage of this lamination dispersion is that the preferred phospholipid composition are not readily available while more generally phospholipid compositions with a substantial amount of mono acyl glycero phospholipid are very expensive. Furthermore, such compositions are in practice produced with the use of phospholipase obtained from swine pancreatic juice which makes the products unacceptable to people of Islamic or Jewish religion.

EP 284026 describes an oil-in-water emulsified fat composition which contains cheese and that is suitable for incorporation and folding into foods. The composition contains 20–85% fat. To obtain a good product the composition must contain 0.1–5% based on the fat of mono acyl glycerol phospholipid and 0.5–5% based on the cheese of "molten salts" (melting salts). The phospholipid emulsifier system is the same as that of EP 327120 described above. The use of melting salts is required to solubilize the protein contained in the cheese. Similar as for the products described in EP 327120 the incorporation of ingredients such as starch materials, gums and preservatives is dispreferred. The resulting product can be flowable and can e.g. be incorporated in cake. The use of more firm products of this type with higher fat content and lower water content for preparing puff pastry is described as well.

WO 94/21128 discloses the use of an aqueous gel containing 20–50% of amylodextrin and 0–30% of β-glucan and/or pentosans as a fat-replacer for making laminate doughs. The publication teaches that the fat-replacer should not be a protein-based fat-replacer because they do not have good rolling-out properties. The use of protein-based materials is also rejected because they fail to give the "fatty impression" expected of laminated baked goods and often have an off-taste.

EP 529891 discloses a particular fragmented, granular amylose starch hydrolysate that can be used as a fat-replacer in foods. Amongst many other applications, use of the hydrolysate to replace a portion of the shortening in layered pastry articles is envisaged.

U.S. Pat. No. 4,752,494 describes a creme filling based on an intermediate water activity matrix. The matrix comprises 30–80% corn syrup, 0–25% maltodextrin, 0–10% lactose, 1–15% caseinate, 0.01–0.10% Ca2+ ions, 0–15% water and optionally further ingredients like 0–10% polydextrose, 0–3% hydrocolloids and 0–5% modified starch. The matrix is heated to cause gelation of the caseinate under influence of the Ca++ ions. The filling is then produced by adding fats and emulsifiers which modify the texture and provide desirable mouthfeel, and flavourings. The filling has a water activity of 0.6 to 0.8. The creme filling has a soft creamy texture and is intended for use particularly in baked products e.g. puffed pastries, pie cookies and other filled baked products. The low water activity is required to prevent moisture migration between the filling and the baked dough and to prevent microbial growth. It is stated that the creme filling can also be used in preparing puff pastry in which a layer of filling is placed on a layer of rolled dough, the dough is folded over several times, rolled out and this process is repeated until numerous alternating dough filling layers are produced.

WO 94/28741 describes a low fat emulsion that can be substituted in 1 to 1 proportions for butter, margarine, shortening, oil, lard, cream cheese and other fats called for in many foods. Three formulae are given which are applicable for different types of foods. For high fat products e.g. croissants, the formula is 27% butter, 46% corn maltodextrin (DE 1–20), 6% rice maltodextrin (DE 1–20), 8% pregelatinized starch, 10.7% water and a range of minor additives. First the butter is creamed, then the other materials are mixed in. Then the product can be rolled into a croissant dough.

The use of lamination dispersions with a continuous aqueous phase offers many potential advantages, some of which have been described in the above publications. Yet, the proposed dispersions not based on a continuous fat phase have not found acceptance and are to the best of our knowledge, not commercially applied. A reason for this, in addition to disadvantages described above, we suspect is that the disclosed lamination dispersion do not have a sufficiently good performance in lamination and/or that the resulting baked laminated products do not have satisfactory sensoric properties such as structure, volume, appearance, taste and/or mouthfeel. As is described in the examples, we have evaluated several of the proposals from the above publications in the preparation of laminated doughs but we could not obtain satisfactory results.

We have studied these issues and we have found that improved lamination dispersion with a continuous aqueous phase can be obtained. We have found amongst other things, that it is not essential to use mono acylglycero phospholipid to obtain a stable dispersion, it is not necessary to include at least 30% oil or fat to get good lamination performance, nor is it necessary to avoid the use of protein to obtain good lamination and good organoleptic properties. We found that in order to be able to get satisfactory results, the water continuous lamination dispersion must at least comprise a combination of hydrocolloids. We do not wish to be bound by theory but we think that in order to get the kind of rheology required to give good lamination performance the continuous phase must have a degree of complexity which, in case of an aqueous continuous phase, cannot be obtained if only a single hydrocolloid is used.

For other applications than lamination dispersions, the literature includes many suggestions for fat replacers. The proposed products include fat continuous and water continuous products. A wide range of hydrocolloids and combinations of hydrocolloids are disclosed. In most cases the proposals concern non-plastic and/or soft products such as desserts, creams and cremes, ice cream, mayonnaise, dressing, cheese spreads and other products for spreading on bread or toast. Examples of such publications are WO 93/17564, U.S. Pat. No. 5,169,671, EP 605 217, WO 94/23587, EP 468, 560, EP 596 546, EP 509707, and EP 298 561. Such products are very different from lamination dispersions. For example, the firmness of very low or zero fat table spreads currently on the market, typically have a firmness at 20° C. as measured by the Stevens value using a cylindrical probe with 4.4 mm diameter of 14–18 g. For a lamination dispersion, this value should be at least about an order of magnitude higher and preferably more. As described in Bailey's cited above, this firmness should be combined with special rheological properties to get good lamination performance.

The invention provides an edible laminated dough comprising a plurality of layers of pré-dough and lamination dispersion, in the preparation of which dough a lamination dispersion has been used that has a continuous aqueous phase
comprises 15–90% water and optionally up to 80% fat
has a Stevens value at 20° C. of 150–2000 g, and
comprises a combination of hydrocolloids including calculated on the non-fat contents of the dispersion,
0.5–40%, preferably 1–40% protein hydrocolloid and
0.1–60%, preferably 0.3–60%, more preferably 0.5–60% non-protein hydrocolloid or gelatin.

The invention provides a big advantage. Not having to use for the preparation of the lamination dispersion equipment normally employed for making fat continuous lamination dispersions provides much flexibility and ingredients can be employed that would give problems in the production lines for conventional fat-continuous products. Products with reduced fat and/or calorie contents can be obtained. The use of fat considered less desirable because of their high contents of saturated and/or trans fatty acid residues can be avoided and fats with higher contents of mono- or poly-cis-unsaturated fatty acid residues can be used instead. Use of fats that have been modified by chemical modification by means of hydrogenation and/or interesterification can be avoided and, if so desired, also the use of fractionated fats can be avoided. Furthermore the lamination dispersions are less sensitive to temperature fluctuations thereby giving convenience to the baker. These and other benefits of water continuous lamination dispersions can be obtained in combination with improved lamination performance and/or improved sensoric properties of the resulting laminated baked products compared with the results obtained with water-continuous lamination dispersions known from the prior art. Also other disadvantages of these prior art products can be avoided.

The structure of a lamination dispersion comprising both a fatphase and an aqueous phase can be assessed by means of microscopic investigation, as is well known in the art.

Thus it can be seen which of the phases is continuous and which, if any, is present as is dispersed phase. An alternative and simple way to assess whether a product has a continuous aqueous phase is by means of electrical conductivity measurement. A fat continuous product without continuous aqueous phase has a conductivity that is practically zero. If a continuous aqueous phase is present, the conductivity is much higher.

For the lamination dispersion to perform well in lamination, it should not be too soft or else it will be pushed out of the dough on the sides and/or it will mix with the pré-dough such that the desired lamination character of the dough is not obtained. Nor should it be too hard because then it will tear holes in the pré-dough. The hardness or firmness can suitably be characterised by means of a Stevens LFRA Texture Analyzer (ex Stevens Advanced Weighing Systems, Dunmore, U.K.). The product is stored at least 1 day at 5° C. and then for 24 hours at the measurement temperature t° C. The Stevens hardness at t° C., St t expressed in grams, is measured using a 4.4 mm round cylinder, loadrange 1000 g, operated "normal" and set at 10 mm penetration depth and 2.0 mm/s penetration rate. Some products are too firm to be measured in this way. Then instead of the Stevens LFRA Texture Analyzer, a Texture Analyzer model TA-XT2 ex Stable Micro Systems, Surrey England using the TPA program, is employed. The 2 pieces of equipment are fully comparable except that the TA-XT2 model can measure more firm products. It has a load cell capacity of 25 kg. Also with this equipment a 4.4 mm round cylinder, a penetration depth of 10 mm and a penetration rate of 2.0 mm/s are employed. In this manner the firmness of samples can be characterised in a consistent yet accurate manner, irrespective of whether the sample is more or less firm.

For convenience, the hardness measured is indicated as St or Stevens value expressed in grams, irrespective of which equipment was used.

Preferably the lamination dispersion used in the preparation of the laminated dough has a Stevens value at 20° C. of 200–1500 g, more preferably of 300–1200 g. Dispersions with Stevens values of e.g. 1500–2000 g would in many cases be found rather hard for direct rolling-in in a pré-dough. However, bakers often have the habit of subjecting a lamination dispersion to working, e.g. by kneading and/or rolling it, before combining the dispersion with the pré-dough and effecting the lamination. Such a working treatment reduces the firmness of the dispersion, e.g. by 30–80%. Other bakers, and especially also plant bakeries, do not have the habit to work the lamination dispersion manually before folding it into the pré-dough and laminating the combination. However, in some such cases, e.g. in some plant bakeries, the dispersion may be subjected to some working by passage through e.g. a fatpump or extruder, before it is folded into the pré-dough. If pré-working of the lamination dispersion is not applied, the lamination dispersion can suitably be somewhat softer than in case pré-working is applied.

An advantage of the present invention is that the present lamination dispersion can be relatively easy to incorporate in the laminated dough, compared with lamination dispersions with a water continuous aqueous phase known from the prior art, making it easy for a baker or a factory to prepare the laminated dough. Accordingly the invention encompasses a process for making the present laminated dough, wherein optionally a lamination dispersion is subjected to working, the lamination dispersion is combined with a pré-dough and the combination is subjected to rolling and folding to obtain a plurality of layers, wherein the lamination dispersion has a continuous aqueous phase, comprises 15–90% water and optionally up to 80% fat, has a Stevens value at 20° C. of 150–2000 g, and comprises a combination of hydrocolloids including, calculated on the non-fat contents of the dispersion 0.5–40% protein hydrocolloid and 0.1–60% non protein hydrocolloid or gelatin.

In some recipes for making laminated dough for example first flour and water and possible other ingredients are combined and kneaded into a (pré-)dough, and subsequently the lamination dispersion is folded into the pré-dough. In other recipes for example the lamination dispersion is cut into little cubes or sticks which are mixed with flour. Then water is incorporated, using e.g. a Diosna kneader. All such recipes are encompassed in the expression "the lamination dispersion is combined with a pré-dough".

The invention also encompasses wholly or partially baked laminated product obtained by baking and/or microwaving the present laminated dough, wherein optionally prior to baking and/or microwaving the dough has been rested, thawed, proofed and/or stored and wherein optionally the baking and/or microwaving has been interrupted.

The invention further provides two lamination dispersions. With these lamination dispersions particularly good laminated doughs and especially attractive baked laminated products can be obtained.

Throughout this specification all percentages, parts and proportions are by weight, unless otherwise indicated. Amounts of hydrocolloids are expressed relative to the weight of the non-fat contents of the lamination dispersion; amounts of other materials contained in the lamination dispersion are calculated on the weight of the total lamination dispersion including its fat contents if any, unless indicated otherwise.

Each of the protein hydrocolloid and the non-protein hydrocolloid can be a single substance or a combination of 2 or more protein hydrocolloids and non-protein hydrocolloids, respectively.

Suitable protein hydrocolloids are for example globular proteins from whey, soyabeans, eggs or peas, which may be present in the dispersion in denatured or in substantially undenatured form. If such proteins are present in denatured form (in a sufficiently high concentration) they can have formed a gel structure in the lamination dispersion. If the proteins are substantially undenatured they will act as thickening agents, without forming a gel.

The lamination dispersion preferably comprises protein hydrocolloid comprising milk protein or protein derived therefrom. Particularly preferred are sodium caseinate, milk casein or protein derived therefrom. Milk protein or protein derived therefrom is preferably present in amounts of 3–35%, particularly 5–30%, calculated on the non-fat contents of the dispersion.

If sodium caseinate is used, it will not normally form a gel but it will act as thickening agent. Milk casein or other protein derived therefrom may or may not be present as a gel depending on the starting materials employed and the processing applied. If the dispersion is a very complex one, it may not be possible to determine for each individual hydrocolloid whether it is present in gelled form or not. Such a situation may for example arise when incorporating cheese, which acts as a source of protein hydrocolloid and, if a fat containing cheese is used, also of fat in the dispersion.

As non-protein hydrocolloid for example a starch-based or gum hydrocolloid can be employed. Starch-based hydrocolloids such as native starch, hydrolysed starch and starch that has been modified otherwise can be suitable. If intact starch is used, preferably it is waxy intact starch, e.g. waxy maize, waxy rice and/or waxy barley starch. Preferred starch hydrocolloids are maltodextrins. Examples of gum hydrocolloids that can be employed are alginates, carrageenans, locust bean gum, carboxymethyl cellulose and xanthan gum.

Gelatin is a protein and it can be used as protein hydrocolloid. However, because in its properties relevant for the present purposes it is quite similar to several gum hydrocolloids it can also be used in stead of non-protein hydrocolloid. To obtain the desired complexity in the aqueous phase of the lamination dispersion, however, a combination of hydrocolloids must be employed. Therefore, if the lamination dispersion comprises gelatin and no non-protein hydrocolloid, a further protein hydrocolloid in addition to gelatin must be present. Preferably, however, the lamination dispersion comprises both protein hydrocolloid and non-protein hydrocolloid. Other preferred non-protein hydrocolloids are oligosaccharides such as polyfructose or inulin, e.g. Raftiline LS ex Tienen Sugar Belgium.

We found that best results are obtained, especially regarding the rheology of the dispersion if the combination of hydrocolloids comprises a gelling hydrocolloid and a non-gelling hydrocolloid. The gelling agent can be either a protein or a non-protein hydrocolloid and similarly the non-gelling hydrocolloid can be a protein or a non-protein hydrocolloid, provided at least one protein hydrocolloid and at least one non-protein hydrocolloid or gelatin is used.

The non-gelling hydrocolloid can also be a hydrocolloid that would gel if used at a high concentration, but that is incorporated in the lamination dispersion at a level too low to cause gelation, i.e. at below its critical concentration. The critical concentration of a gelling agent in a particular dispersion can be determined as described in Br. Polymer J. 17 (1985), 164. If a mixture of gelling agents is used, the critical concentration of that mixture can be determined in an analogous manner. A further description of methods for assessing complex gel systems is given in J. Colloid and Interface Sci. 81 (1981), 519.

It is particularly preferred that the gelling hydrocolloid comprises an aggregate-forming gelling agent. The aggregates formed by the aggregate forming gelling agent preferably have a compact shape (i.e. with dimensions in the three directions not largely different) rather than a long, thin rod-like shape. The gel formed by an aggregate forming gelling agent consists of a three-dimensional network wherein the units composing the network are particles much larger in size than the molecules of the gelling agent itself. This usually means that the network will be based on units larger than 0.01 μm diameter (or thickness, in case of rod-like aggregates).

Whether a gel forming agent is an aggregate forming gelling agent can be determined for example by measuring the turbidity of the gel or by use of an electron microscope as described in EP 0 298 561. Preferably, the dispersion comprises aggregates having a mean size of 0.01–10 μm, more preferably 0.05–5 μm. Preferred aggregate forming gelling agents and the amounts in which they are preferably employed (on non-fat contents) are:

| Preferred aggregates forming gelling agents | Preferred amounts applied (on non fat contents) |
| --- | --- |
| maltodextrin, DE < 20, preferably 1–10, more preferably 2–5 | 20–50%, preferably 25–45% |
| polyfructose | 25–55%, preferably 30–50% |
| denatured globular protein | 10–35%, preferably 15–30% |

Suitable maltodextrins can for example be prepared by hydrolysis of potato starch, e.g. Paselli SA2®, oat starch, e.g. Oatrim® or Trim Choice® (both of which also comprise some β-glucan) and maize starch, e.g. N-Lite-B®. A suitable polyfructose is for example Raftiline LS®. Examples of denatured globular protein that can be employed are proteins from whey, soyabeans, eggs and peas, which are caused to be present in the lamination dispersion in denatured form (see also below).

Preferred non-gelling hydrocolloids, apart from Na-caseinate, non-gelling milk casein and other proteins derived therefrom already mentioned above, and the amounts in which they are preferably employed (on non-fat contents) are:

substantially undenatured globular protein 3–25%, preferably 5–20% gum thickening agent 0.1–8%, preferably 0.3–5%, especially 1–5%

Examples of suitable sources of undenatured globular proteins are the same as mentioned above for aggregate forming denatured globular protein gelling agents. Examples of suitable gum thickening (as opposed to gelling) agents are locust bean gum, xanthan gum and carboxymethylcellulose.

Combinations of the above gelling agents can also give good results. The amounts in which each of them is applied should then be adapted of course. The same applies for combinations of non-gelling hydrocolloids. In this respect it should be kept in mind that if locust bean gum and xanthan gum are applied together, they may form a gel.

To obtain optimal products it is preferred for the lamination dispersion to comprise 20–80% water, more preferably 23–70%, especially 30–65% water. Expressed on the non-fat weight of the lamination dispersion, the water content preferably is 25–90%, more preferably 30–85%, particularly 35–82%. Most preferably the watercontent is 40–70%, especially 45–65% of the non-fat contents of the lamination dispersion. The combined amount of hydrocolloids preferably is 15–60%, more preferably 20–55%, especially 25–50% calculated on the non-fat contents of the dispersion.

We found it desirable, in order to be able to get a satisfactory laminated dough, for the lamination dispersion, and especially the non-fat content of the lamination dispersion, to contain a substantial, but not excessively high amount of water as indicated above. We found for example that the presence of substantial amounts of hydrolyzed starch with high DE value in the lamination dispersion, resulting in a very low water content, made it difficult to obtain a good laminated dough. When using very low amounts of hydrocolloids and very high amounts of water, mostly the resulting lamination dispersion was too soft. But also if the hydrocolloids were chosen such that a sufficiently firm lamination dispersion was obtained, we found that lamination performance tended to be not good if the water content was very high. Optimal results were obtained for the laminated dough if the non-fat contents of the lamination dispersion contained 35–82% water and a combined amount of protein and non-protein hydrocolloids of 15–60%, especially 40–70% water and 20–55% hydrocolloids. Best results were obtained with 45–65% water and 25–50% hydrocolloids in the non-fat contents of the lamination dispersion.

Depending on the intended application, fat may be incorporated. If it is desired to achieve a "zero-fat" or a very low calorie baked product, the lamination dispersion should be substantially free from fat. For other intended applications, fat may be incorporated. If fat is used, preferably up to 75%, more preferably 5–60% especially 10–50% is employed. The use of a water-continuous lamination dispersion has the advantage that it gives a much wider choice of fats that can be employed. Preferably fat is employed that has not been subjected to chemical modification, i.e. that has not been subjected to hydrogenation or interesterification. It is preferred to use fat that has also not been fractionated. Another opportunity is to employ fat with a much higher content of cis-unsaturated fatty acid residues than can be used in case of a conventional fat-continuous lamination dispersion. Preferably, the fat employed comprises at least 50% cis-unsaturated fatty acid residues. Particularly preferred are liquid vegetable oils, e.g. soyabean oil, sunflower oil, rapeseed oil etc., and mixtures of such oils. Another preferred fat, for flavour reasons, is milk fat or fat derived therefrom, e.g. butter and butterfat. Butter itself is not a very suitable lamination dispersion, especially if it is to be employed in a bakery with a relatively high temperature, because then it is too soft. According to our invention, the beneficial taste and flavour contributions to the baked product can be obtained without adverse effects on the lamination performance. In the lamination dispersion fat, if any, is preferably present as a dispersed phase. Fat may however also be present in the dispersion as a second continuous phase in addition to the continuous aqueous phase. Preferably the fat is dispersed such that the average fat globule size is less than 100 μ (micron), more preferably less than 50 μ, especially less than 25 μ.

The lamination dispersion does not need to contain emulsifier. Especially, if the dispersion is substantially fat free there will usually not be a benefit in incorporating emulsifiers. Also when fat is incorporated at a low level, depending on the composition employed and the processing applied, a stable lamination dispersion can be obtainable without using emulsifiers.

In other cases, especially if higher fat levels (and particularly soft fats, e.g. liquid oils) are employed, e.g. 20% or more, it may be desirable to incorporate an emulsifier or a mixture of emulsifiers. The choice of emulsifier is not critical. Common O/W emulsifiers can be used. Preferably an emulsifier isolated from nature rather than a chemically produced one is employed. A preferred emulsifier is phospholipid, especially phospholipid that has not been subjected to chemical modification such as hydrolysis. A particularly preferred emulsifier is soyabean lecithin that has not been hydrolysed. Specifically, the use of expensive phospholipid such as recommended in EP 327 120, which in practice would render the product unacceptable to people of Jewish or Islamic religion, is preferably avoided. If emulsifier is included in the lamination dispersion, it is preferably employed in an amount of 0.1–5% particularly 0.2–3% calculated on the weight of the dispersion.

The lamination dispersion may comprise apart from water, fat, hydrocolloids and emulsifier, other ingredients that are commonly employed in lamination dispersions, e.g. preservatives, salt and food grade acid to adjust the pH, e.g. lactic acid or citric acid, colourant, flavour etc.

The composition and preparation of the pré-dough used for preparation of the laminated dough can be as usually employed for preparing laminated dough. Usually such pré-dough will comprise per 100 parts flour, 45–63 parts, mostly 50–60 parts water, 0–20 parts mostly 0–15 parts additives and 0–30 parts, mostly 0–20 parts fat. As additive, for example salt can be included. For laminated doughs containing yeast, the yeast is included in the additives. Together with the yeast usually some sugar is employed which is also included in the additives. The additives may further include other dough improvers e.g. ascorbic acid, enzymes etc. The amount of water is usually adapted depending on the properties of the flour. Specific recipes and ways in which the pré-doughs can be prepared, are described in the examples.

A further advantage of the present invention is that dough improvers can be incorporated via the lamination dispersion. Normally, fat continuous laminations dispersions do not include additives intended to act as dough improvers. Such improvers act on the flour of the dough or serves as food for yeast, if present. In fat continuous lamination dispersions with a dispersed aqueous phase such dough improvers would be trapped in the fat and would only reach the flour/yeast when the fat melts during baking. At such a late stage, such dough improver cannot be very effective anymore. In the present invention, such dough improvers are present in the continuous aqueous phase of the lamination dispersion. Therefore, they can already migrate to the flour/yeast during the lamination process. For example, in the lamination dispersion, beneficially small amounts of ascorbic acid or sugar can be included. This can be particularly suitable for yeast lamination doughs, e.g. doughs for croissants or Danish pastry. In such cases, e.g. 2% of sugar calculated on the amount of flour in the dough, but supplied by the lamination dispersion, can already be effective. The amount of sugar to be incorporated in the lamination dispersion then of course depends on the intended dough recipe. Usually the amounts of pré-dough and lamination dispersion are such that the weight ratio of flour to lamination dispersion is between 1:0.3 and 1:1.3 especially between 1:0.4 and 1:1.2. Accordingly, a small amount of sugar e.g. 1–5% in the lamination dispersion can already be effective. This approach simplifies the work to be done by the baker or in the factory to prepare the laminated dough.

The invention further provides an edible lamination dispersion with which particularly good results can be obtained with respect to lamination performance, each of handling as well as overall quality of the resulting laminated dough and baked products therewith obtained. The preparation of the lamination dispersion is also straight forward. This lamination dispersion has a continuous aqueous phase, comprises at least 15% water and optionally up to 80% fat, has a Stevens value at 20° C. of 150–2000 g and comprises, calculated on the non-fat contents of the dispersion 20–50% aggregate forming gelling maltodextrin having a DE of less than 20 and 3–25% non-gelling protein hydrocolloid. This combination of hydrocolloids gives particularly good performance. Particularly preferred maltodextrin has a DE of 2–5, maltodextrin derived from potato starch giving especially good results. The amount in which it is best applied is 25–35%. Preferred protein hydrocolloids are non-gelling milk casein and proteins derived therefrom, substantially undenatured globular protein and combinations thereof. The most preferred non-gelling protein hydrocolloid is sodium caseinate. The amount in which the protein hydrocolloid is best applied is 5–20%, especially 7–18%. The combined amount of hydrocolloid expressed on the non-fat contents of the dispersion is best chosen as 30 . 50%, especially 35–45%, with a water content of 50–70%, especially 55–65% of the non fat contents. The fat content preferably is 0–60%, more preferably 5–60%, ideally 10–50%.

Typically a lamination dispersion, e.g. a fat continuous one, contributes to the lamination process, to the structure of the baked product and also to its mouthfeel. But it normally contributes only little to the taste and flavour of the baked product. The present invention provides a wide spectrum of opportunities for the lamination dispersion to contribute to the taste and flavour of the baked product. For example, according to a preferred embodiment, the lamination dispersion includes cheese. Such a dispersion can for example be used for making cheese-croissants and the like. Another material that can be employed to make a taste and flavour contribution is egg-yolk. A particularly rich flavour and taste can be obtained if cheese and egg-yolk or whole egg are used in combination. In such a case egg-yolk will also serve as emulsifier, and no other emulsifier will normally be required. When using cheese, its casein supplies protein hydrocolloid. To get optimal texture for the dispersion, it should also include non-protein hydrocolloid and/or gelatin. In such cases preferably gelatin and/or a gum hydrocolloid is used, e.g. locust bean gum and/or xanthan gum.

We found that when using cheese, to get good results it is particularly desirable for the fat content of the lamination dispersion not to be very high while the water content of the dispersion should not be too low. These features are desirable not only for taste and texture reasons, but also from a nutritional and cost perpective. Accordingly the invention also provides an edible lamination dispersion suitable for use in the preparation of the present laminated dough, which lamination dispersion has a continuous aqueous phase, comprises 25–80% water and optionally up to 60% fat, has a Stevens value at 20° C. of 150–2000 g, and comprises calculated on the non-fat contents of the dispersion, 10–40% protein hydrocolloid derived from cheese and 0.1–8% non-protein gum hydrocolloid and/or gelatin. Contrary to the teaching of EP 284026 we found it preferable not to include melting salts in combination with cheese in the lamination dispersion. The use of such melting salts caused substantial shrinkage of the dough during lamination making the product difficult to handle. We do not wish to be bound by theory but we believe that the so-called non-dissolved protein in cheese plays functionally a comparable role in the present lamination dispersion as the aggregate forming gelling agents. Incorporation of melting salts causes this functionality to be lost. Possibly this difference in experience is related to the lower fat and higher water contents in our product compared to hose of EP 284026.

The cheese based lamination dispersion preferably comprises 0.1–5%, especially 0.1–3% gum hydrocolloid calculated on the non-fat contents of the dispersion. The amount of cheese used in preparing the dispersion preferably is 20–90%, especially 45–85% calculated on the weight of the resulting dispersion. The fat content of the cheese based lamination dispersion preferably is 10–60%, especially 25–45%. Its water content, on total dispersion, preferably is 25–60%, especially 35–50%. The protein content preferably is 10–30%, especially 12–25% calculated on the total dispersion.

Generally, for good lamination performance it is desirable that the lamination dispersion has a smooth texture and is substantially free of lumps. When including for example materials such as cheese it may be appropriate to subject part or all of the composition that is to constitute the dispersion, to a homogenisation treatment, e.g. by passing it through a colloid mill or a high pressure homogenizer. Preferably the lamination dispersion is substantially free from particles bigger than 100 $\mu$, more preferably it is substantially free from particles bigger than 50 $\mu$, especially 25 $\mu$.

The dispersion can be prepared in many different ways. For example, water can be heated, e.g. to 95° C., the hydrocolloids and other ingredients are added while stirring to obtain a homogeneous mixture. The product is filled hot in a suitable container and it is allowed to cool down at rest, e.g. by storage at 15° C. Alternatively, the hot mixture can be cooled down, e.g. by passage through a tubular heat exchanger and the product exiting therefrom is filled in containers and allowed to rest. If fat is employed, it is preferably included in liquid form.

Thus it may be appropriate to heat the fat such that it is completely molten before admixing it with the other components.

To disperse the fat, high speed stirring can be sufficient, but the composition may also be homogenized in another way, e.g. by passage through a colloid mill. If the composition comprises emulsifier such as lecithin, this can suitably be incorporated by first dispersing it in the molten fat.

If it is intended that the composition comprises an aggregates containing gel from denatured globular protein, for example undenatured globular protein can be used as starting material, and denaturation can be caused to occur by subjecting the aqueous mixture to a sufficiently high temperature. When using denatured globular protein as aggregate forming gelling agent, preferably the composition is caused to have a pH, e.g. by the incorporation of acid, close to the isoelectric point of the protein involved. Suitably the difference in pH of the dispersion and of the isoelectric point is less than 0.4 pH units, preferably less than 0.3 pH units, more preferably less than 0.2 pH units. A somewhat bigger pH difference can be employed if the salt concentration of the dispersion is high.

On the other hand, if undenatured globular protein is to be present as non-gelling thickening hydrocolloid, care should be taken not to subject the protein to conditions that would cause denaturation. For example, the protein may be dissolved in a portion of the water at a relatively low temperature. The other ingredients can be mixed with the remainder of the water at higher temperature, thereby simultaneously pasteurizing it. This composition is then cooled down to a temperature sufficiently low to prevent denaturation, the mixture of water and undenatured globular protein is mixed in, and the mixture is packed and cooled down further, or first cooled down quickly and then packed. The products should be stored prior to use for a sufficiently long period for the hydrocolloid structure to fully develop. How long this will take depends on the composition employed and the storage temperature, but 3–7 days at e.g. 5° C. will in practice nearly always be sufficient.

Good keepability can be obtained by the use of low pH, the presence of salt of other preservatives such as potassium sorbate and sodium benzoate, hygienic or aseptic processing and packaging material, the use of a heattreatment sufficient to pasteurize or steralize the product, e.g. UHT treatment for 4 minutes—4 seconds at 120–140° C., or a combination of such measures. If a heattreatment such as pasteurisation or sterilisation is employed and the composition comprises egg yolk, the egg yolk may loose its emulsifying functionality. To prevent this, pasteurized egg yolk can be employed that is commercially available. The rest of the composition can then be given a heattreatment. The pasteurized egg yolk can be admixed after the composition has been cooled down to a sufficiently low temperature, e.g. 50–55° C. If appropriate the composition can be homogenized, e.g. by passage through a colloid mill and then be packed and cooled down. Such a process can for example conveniently be carried out in Fryma® equipment designed for batch-wise production of mayonnaise and the like. Alternatively, the egg yolk can be made heat stable by treating it with e.g. phospholipase A2. Such stabilized egg yolk can be pasteurized without loss of emulsifying functionality.

In a preferred process for preparing lamination dispersion with the incorporation of cheese, a mixture of all ingredients is subjected to a heattreatment e.g. at 70–90° C. for 1–10 minutes, and a homogenisation treatment preferably carried out by passing the mixture while still hot, through a high pressure homogenizer.

The lamination dispersion can be used in the preparation of laminated dough, e.g. for croissants, Danish pastry and puff pastry, in the usual way. Normally the lamination dispersion is taken from cooled storage and placed at bakery temperature, e.g. 20° C., 1 day before the dough preparation. To prepare the dough, first a pré-dough is prepared suitable for the intended application, optionally the lamination dispersion as such may be worked, e.g. by rolling it out, the dispersion is put on the pré-dough, which is folded around it, and the combination of pré-dough and lamination dispersion is rolled and folded a number of times, optionally with intermediate or subsequent resting stages. As already mentioned above, pré-dough and lamination dispersion can also be combined e.g. by mixing pieces of lamination dispersion into flour and optional other ingredients and subsequently incorporating water and possible further materials still to be added. The dough preparation is preferably carried out such that the laminated dough comprises 5–800, more preferably 8–100 layers of lamination dispersion. It is an advantage of the present invention that baked products with good structure can be obtained using laminated dough with relatively few layers. Thus the required amount of handling is reduced.

If so desired, in addition to the present lamination dispersion also another, e.g. a conventional fat continuous lamination dispersion can be incorporated in the laminated dough. For example, first half of the usual amount of lamination dispersion of the present invention is folded into a pré-dough. The combination is once rolled and folded. Then a similar amount of the other lamination dispersion is folded into the dough and rolling and folding is completed as usual. In this way the dough will comprise layers of each of the lamination dispersions. Preferably, the lamination dispersion contained in the laminated dough consists for at least 50% of the water continuous lamination dispersion as described above. More preferably the laminated dough consists of pré-dough and water continue lamination dispersion as described herein.

The laminated dough can subsequently, optionally after having been proofed if applicable, be baked to obtain the end product. If the product is not command shortly after baking, if so desired the product can be reheated before it is eaten. It is also possible to include an intermediate storage stage, wherein the laminated dough is chilled or frozen or preserved otherwise, optionally packed, and kept for some time before it is baked. In this way, for example, the laminated dough can be sold as such to the consumer, allowing him or her to prepare freshly baked products at home in a very easy way. If the dough needs proofing, e.g. for croissants, such intermediate storage can be carried out prior to, or after part or all of the required proofing. Thus the lamination dispersion can be employed for preparing for example pré-proofed or ready-to-bake laminated doughs as e.g. described in EP 493 850, EP 542 353, WO 93/22928 or PCT/EP94/04165. The lamination dispersion can also be used for preparing microwaveable laminated doughs for pastries, croissants and the like. Similarly it can be used for preparing "partially baked" products, e.g. wherein banking and/or microwaving is interrupted, the product is optionally frozen or preserved otherwise, packed and sold and the customer only needs to apply a short residual baking and/or microwaving treatment.

Especially when the lamination dispersion is prepared using substantial amounts of cheese, the dispersion can make an excellent contribution to the taste and flavour of the product. For example cheese croissants can be prepared without the need for the baker to add cheese separately, which brings a.o.t. convenience to the baker. Puff pastries prepared with such cheese lamination dispersion are eminently suitable for preparing e.g. vegetarian pastries filled with a vegetable based filling. Numerous other applications present themselves for the lamination dispersion, prepared with or without cheese and for the laminated dough. For example pastries can be prepared which contain a sausage which is folded into the laminated dough and baked with it, fruit pieces can be incorporated etc.

EXAMPLES

Examples 1–4

A series of lamination dispersions was prepared using aqueous phase compositions as given in Table I. In each case, the water was heated to 95° C. The maltodextrin Paselli SA2® was dispersed into it using a Waring® blender. Then the Na-caseinate was added (except for comparison A in which only Na-caseinate was used). In each case 57 parts of aqueous phase were prepared.

A fat phase was prepared by heating a mixture of 50% partially hydrogenated soyabean oil, 25% palm oil, 15% partially hydrogenated palm oil and 10% sunflower oil to 60° C. to fully melt it and per 40 parts of fat, 3 parts of (unhydrolysed) soyabean lecithin having a phospholipid content of 50% was mixed into it. For all lamination dispersions this same fat phase composition was used. The fat in this fat phase is softer and has a higher content of cis-unsaturated fatty acid residues than the fats that are commonly employed in fat continuous lamination dispersions.

The aqueous phase composition was transferred to a Kenwood® mixer which was operated at stirring speed 1. To 57 parts of hot aqueous phase composition, 43 parts of fatphase of 60° C. was added slowly while containing mixing. After all fatphase was added, stirring was continued for 2 minutes.

The dispersion was filled into small plastic buckets, they were closed and stored for 1 week at 5° C.

In each case, the maltodextrin and formed and aggregates containing gel. The Na-caseinate had not formed a gel.

The Stevens values at 20° C. were measured of the lamination dispersions, and again after the dispersion had been rolled out by the baker before combining the dispersion with the pré-dough. The results of the Stevens measurements are also given in Table I.

In each case a laminated dough was prepared with the lamination dispersion using the so-called pencil method: For the pré-dough 500 g flour and approximately 270 g water is used. (The precise amount of water depends on the flour type. The Farinograph water absorption value minus 4% was used). 400 g of the lamination dispersion is cut in pieces of about 1×1×4 cm and mixed with the flour. The water is added to this mixture in a small Diosna kneader, and the Diosna is operated for about 50 strokes. The composite dough (pré-dough combined with lamination dispersion) is rolled out via dial positions on the rolling machine to a layer of pre-determined thickness in the following steps: 25-20-15-10-8 mm. The piece of dough is folded in three, turned 90° and rolled out as before. It is folded again in 3, turned 90° and rolled out as before. Then it is folded again in 3 and rolled out via the dial positions on the rolling machine with the following steps 24-20-15-turn 90° -12-8-6-turn 90° -4-3.75 mm. Thus, a laminated dough with 27 layers of lamination dispersion separated by layers of pré-dough is obtained.

Dough pieces for vol au vents of standard size and shape are cut from the dough and put on a baking plate. They are allowed to rest and baked in a preheated oven for about 20 minutes at 240° C.

After baking, the puff pastries are allowed to cool down for 1 hour at ambient temperature. Then the weight and height are determined and the "Gravity Index" (GI) is calculated (height in mm divided through weight in gram). The GI indicates the lift of the pastry. The Top shrink is determined by measuring the decrease of the size of the top of the baked pastry with respect to the size of the unbaked pastry. It indicates the degree of shinkage of the top of the pastry during baking. Generally speaking it can be said that GI should be as high as possible and the Top shrink should be as low as possible. Some of the pastries are cut in half and the baker scores the structure of the pastry on a 1–5 scale. 1 indicates a fine lamellar structure, 5 indicates a very open structure while the score for typical good quality pastry is 2.5 or 3.

The results obtained are given in Table I.

Overall, the lamination performance, i.e. the handling of the lamination dispersion, the behaviour of the dispersion during the preparation of the laminated dough and the type and presence of layers in the baked product was good for examples 1–4. Also the overall evaluation of the baked product was good for examples 1–4. Overall the baked product of example 1 was found to be the best. However, the lamination dispersion of comparison A was not appreciated by the baker. The product was too soft and therefore difficult to handle. During kneading and lamination the lamination dispersion mixed up partly with the pré-dough resulting finally in insufficient layer formation. The top shrink was fairly high while the GI was somewhat lower than for the other dispersions.

TABLE I

| Example | 1 | 2 | 3 | 4 | Comparison A |
|---|---|---|---|---|---|
| Aqueous phase compositions | | | | | |
| Na-caseinate (%) | 12.5 | 12.5 | 15 | 20 | 30 |
| Paselli SA2 (%) | 25 | 30 | 30 | 25 | — |
| Water (%) | 62.5 | 57.5 | 55 | 55 | 70 |
| Stevens | | | | | |
| St 20° C. | 502 | 647 | 785 | 576 | 103 |
| St after rolling out | 213 | 276 | 331 | 273 | 59 |
| Baking results | | | | | |
| GI | 0.68 | 0.76 | 0.80 | 0.81 | 0.73 |
| Top shrink | 7.6 | 7.6 | 7.2 | 3.9 | 12.8 |
| Structure | 2.5 | 3 | 3 | 3 | 3 |

Examples 5–6

The above example was repeated except that different aqueous phase compositions were used and that, after addition of the fat and emulsifier to the hot aqueous phase composition, stirring was continued for 4 minutes. The aqueous phase compositions used and the results obtained are shown in Table II. Both the lamination dispersions and the laminated doughs were judged to be good.

TABLE II

| Example | 5 | 6 |
|---|---|---|
| Aqueous phase composition: | | |
| Na-caseinate (%) | 10 | 10 |
| Paselli SA2 (%) | 25 | 30 |
| Water (%) | 65 | 60 |
| Stevens | | |
| St 20° C. | 396 | 750 |
| St after rolling out | 275 | 279 |
| Baking results | | |
| GI | 0.76 | 0.63 |
| Top shrink | 6.4 | 10.0 |
| Structure | 3 | 3 |

With respect to baking trials it should be kept in mind that only comparisons should be made between products baked in a single series of trials. Many external factors can influence the results, e.g. the temperature and humidity of the bakery and the type of flour, its age and storage history. The same applies for yeast, if used. Especially the flour can have a big influence. If a lot of flour is split in two parts, one stored for 3 weeks at 20° C. and the other at 5° C., perceivable differences in dough handling and properties of baked product may result. Therefore, comparisons should only be made between trials from the same series.

Example 7–17

Fat free lamination dispersions were prepared using aqueous phase compositions as given in Table III. The lamination dispersions were prepared as described for examples 1–4 except that no fat and emulsifier were included. After 1 week storage at 5° C. the Stevens at 20° C. and after rolling out of the dispersion were measured. The results are also given in Table III.

Croissant pré-dough was prepared using the following recipe:

| Flour | 1000 parts |
|---|---|
| Yeast | 50 parts |
| Salt | 20 parts |
| Sugar | 20 parts |
| Dough improver | 30 parts |
| Water | 580 parts |

The pré-dough was prepared by kneading all the ingredients for 2 minutes at speed 1 and for 4 minutes at speed 2 in an Eberhardt® spiral kneader. The pré-dough was allowed to rest for 10 minutes. Lamination: flour/lamination dispersion in 1/1 ratio. 2× folded in 4=16 layers.

For each dough 2 different fermentation times were applied: 40 minutes and 60 minutes at 32° C. and 85% RH. The shaped doughs were baked for 18 minutes in a pré-heated oven at 200° C. with 5 seconds steam injection. The croissants were evaluated for specific volume and structure. The results are given in Table III.

For comparison, two trials were included with lamination dispersions that did not contain protein hydrocolloid (comparisons B and C). As further comparison, several times together with dough prepared with a water continuous dispersion, simultaneously also a dough prepared as described above but containing Trio Toer® as lamination dispersion, was baked in the same oven. Trio Toer is a fat continuous margarine with a dispersed aqueous phase intended for making laminated products. The highest and lowest values obtained for the S.V. and structure for the products made with the fat continuous lamination dispersion in this series of trials are given in Table III under comparison D.

TABLE III

| | Composition* | | Stevens | | Baking results | | | |
|---|---|---|---|---|---|---|---|---|
| | Na- | Paselli | | rolled | 40 min[+] | | 60 min.[+] | |
| Example | caseinate (%) | SA2 (%) | 20° C. (g) | out (g) | S.V | Structure[$] | S.V | Structure[$] |
| 7 | 15 | 25.2 | 445 | 105 | 8.0 | 4 | 7.8 | 4 |
| 8 | 15 | 26.1 | 530 | 150 | 8.3 | 4 | 7.7 | 4 |
| 9 | 15 | 26.8 | 670 | 205 | 8.8 | 3 | 8.8 | 4 |
| 10 | 15 | 27.4 | 675 | 215 | 8.0 | 4 | 9.4 | 4 |
| 11 | 12.5 | 27.6 | 520 | 155 | 9.1 | 3 | 9.6 | 3 |
| 12 | 12.5 | 28.2 | 565 | 165 | 9.1 | 3 | 11.1 | 3 |

TABLE III-continued

| | Composition* | | Stevens | | Baking results | | | |
| | Na-caseinate | Paselli SA2 | rolled 20° C. | out | 40 min+ | | 60 min.+ | |
| Example | (%) | (%) | (g) | (g) | S.V | Structure§ | S.V. | Structure§ |
|---|---|---|---|---|---|---|---|---|
| 13 | 12.5 | 29.3 | 745 | 270 | 7.6 | 4 | 10.8 | 4 |
| 14 | 10 | 29.7 | 570 | 220 | 6.7 | 4 | 9.7 | 4 |
| 15 | 10 | 30.3 | 600 | 235 | 8.4 | 4 | 8.6 | 4 |
| 16 | 7.5 | 30.7 | 515 | 225 | 8.3 | 4 | 10.2 | 4 |
| 17 | 7.5 | 31.4 | 520 | 220 | 9.8 | 4 | 9.8 | 4 |
| Comparison B | — | 33.0 | 445 | 140 | 8.8 | 5 | 8.6 | 5 |
| Comparison C | — | 35.0 | 635 | 255 | 8.0 | 5 | 7.7 | 5 |
| Comparison D | Not Appl. | Not Appl. | — | — | 7.4–5.9 | 3–3 | 10.6–6.7 | 3–3 |

*The remainder of the composition consisted of water
+Fermentation time applied
§Scale from 1–5, 1 indicates bread-like structure, 5 indicates a too open structure. Typical good quality croissant has structure score 3.

The results obtained with the fat continuous lamination dispersion (comparison D) show that the S.V. may vary substantially between different baked lots even though they are from the same series of trials. However the structure of the baked product does not fluctuate substantially.

The S.V.'s obtained with the water continuous dispersions with 60 minutes fermentation time are quite comparable to those obtained with the fat continuous product. For 40 minutes fermentation time, the water continuous products tended to give a higher S.V. than the fat continuous product. A higher S.V., within reason, is usually judged to be a positive rather than a negative attribute, and the S.V.'s found with 40 minutes fermentation time were found to be quite acceptable.

The water continuous dispersions without protein hydrocolloid (comparison B and C) had a poor open structure. The examples all gave better structures than these comparisons and for several of the examples the structure was as good as that obtained with the fat continuous product (comparison D).

Furthermore, during dough preparation, the baker found comparisons B and C less good than the examples. Comparisons B and C were more brittle and had more tendency to break and crumble while the examples were more plastic and easy to roll out.

Shaped pieces of dough from examples 14, 15, 16 and 17 were, prior to fermentation, frozen at –20° C. They were kept at that temperature for 20 days. They they were thawed during 60 minutes in 20° C. and proofed during 90 minutes at 32° C. and 65% Relative Humidity. They were then baked for 18 minutes at 220° C. the 5 seconds steam injection.

The resulting products were very good. They had the following SV's and Structure scores:

| Example | S.V. | Structure |
|---|---|---|
| 14 | 8.2 | 4 |
| 15 | 7.5 | 3 |
| 16 | 8.2 | 3.5 |
| 17 | 8.0 | 3.5 |

Example 18

18 kg of lamination dispersion containing 31% Paselli SA2 and 7.5% sodium caseinate with the balance of water was prepared in a Molto Mat Universal (MMU-20) ex Krieger, Switzerland. The water was heated to 90° C. and the Paselli SA2 was dispersed into it. Then the sodium caseinate was mixed into it. The product was packed while hot in 2 l plastic buckets and stored for 1 week at 5° C. and then 1 day at 20° C. The St 20 was 580 g, after rolling out it was 275 g.

Croissant pré-dough was prepared as in example 7–17, except that 125 parts dough improver and 490 parts water were employed. The preparation of laminated dough and baked croissants was as in examples 7–17, 60 minutes proofing time was applied. The resulting croissants had SV 9.8 and structure score 3.5.

Example 19

1 kg of a lamination dispersion was prepared that contained 40% Raftiline LS® and 12.5% sodium caseinate, the balance being water using a Waring® blender. The water was heated to 60° C. and the Raftiline was dispersed in it. Then the sodium caseinate was mixed into it. The product was packed and stored for 1 week at 5° C. and for 1 day at 20° C. The St 20 was 215 g.

Croissants were prepared with this lamination dispersion in the same way as in example 18. They had S.V. 7.5 and structure score 2.

For comparison, in the same manner two dispersions were prepared containing no sodium caseinate but 40% and 50% Raftiline LS® (comparisons E and F). The ST 20 values were 145 and 200. When starting to prepare the dough the products softened dramatically and they were pushed out from the dough on the sides during lamination such that proper lamination doughs could not be obtained.

Example 20

800 g. of a lamination dispersion containing 20% whey protein and 2% locust bean gum the remainder being water were prepared by dissolving the ingredients in water of ambient temperature. The whey protein was denatured by addition of 6N HCl down to pH 5.3 and heating to 85° C. After packing the product was stored for 1 week at 5° C. and for 1 day at 20° C.

Croissants were prepared as in example 18. They had S.V. 4.3 and structure score 2.

For comparison (comparison G), a dispersion was prepared containing only 20% denatured whey protein and no locust bean gum. The resulting product was very brittle and crumbly. Upon trying to make the laminated dough it could not be rolled out, but instead broke into pieces.

Example 21

A lamination dispersion was prepared as described in Example 1.

With this dispersion croissants were prepared according to the following recipe:

| Pre-dough: | Flour | 1000 parts |
|---|---|---|
| | Water | 550 parts |
| | Salt | 20 parts |
| | Yeast | 50 parts |
| | Fat | 20 parts |
| | Sugar | 30 parts |
| | Dough improver | 0.26 parts |

The ingredients are kneaded for 2 minutes at speed I and 6 minutes at speed II in a Eberhardt spiral kneader.

Rest: 10 minutes at 20° C., RH of 75%.

1700 parts of pre-dough is rolled out to a sheet of 10 mm thickness.

600 parts of lamination dispersion is rolled out to 10 mm thickness.

The dispersion is placed on top of the pré-dough which is folded around it.

Roll out via 30-25-12-10 to 8 mm thickness.

Fold in 4, turn 90°.

Roll out via 30-25-15-12-10 to 8 mm. Fold in 4.

Roll out via 30-25-15 to 15 mm, turn 90°.

Roll out via 10-8-6 to 6 mm, turn 90°.

Roll out 5-3.5-3 to 2.75 mm.

The resulting dough thickness is 4 mm. Cut dough in triangles of 21×10 cm. Roll the triangles with a stretch of 20%. Fermentation: 60 minutes at 32° C., 80% RH.

Baking:

5 sec. steam injection 18 minutes at 220° C.

The resulting croissants were evaluated by an experienced panel which rated the croissants for the following

| External: | Form/Shape |
|---|---|
| | Crust |
| | Colour |
| Internal: | Structure/grain |
| | Colour |
| | Taste |
| | Aroma |
| | Texture | for each attribute a scale from 1 to 5, or from 1 to 7 was employed, score 3 being optimal in each case for croissants. For each of the attributes the average score of the panel for the croissants was 3. They were very good.

Example 22–23

A lamination dispersion was prepared as described in examples 5–6 except that an aqueous phase prepared as described in example 19 was used. A further dispersion was prepared in the same way except that the aqueous phase contained 50% Raftiline LS and 7.5% sodium caseinate.

With these lamination dispersions puff pastries were prepared as described in examples 5–6. Acceptable pastries were obtained.

Example 24

An aqueous phase comprising 30% Paselli SA2 and 15% undenatured whey protein was prepared by dispersing the Paselli in water at 95° C., cooling down the mixture to 40° C. and dispersing the whey protein into it. With this aqueous phase a lamination dispersion and puff pastry was prepared as described in Examples 1–4. The pastries had GI=0.7, Top shrink 9% and Structure score 3.

Example 25

To 480 g water of ambient temperature, 108 g. whey protein and 12 g. locust bean gum were added. The mixture was acidified to pH 5.3 using 6N HCl. The mixture was heated to 40° C. and to 57 parts of this mixture 43 parts of fatphase as described in examples 1–4 was slowly admixed. The mixture was heated to 75° C. while stirring and the mixture was kept at this temperature for 30 minutes. It was then packed and stored at 5° C.

With the dispersion, puff pastries were prepared as described in examples 1–4. Good pastries were obtained having GI 0.8, top shrinkage 4.5% and structure score 3.

Example 26

A lamination dispersion was prepared from the following ingredients:

| Jong belegen Gouda cheese | 10% |
|---|---|
| Extra belegen Gouda cheese | 20% |
| Parmesan cheese | 2% |
| Green cheese** prepared from UF retentate | 25% |
| Whey protein concentrate (80%) | 3% |
| Skimmilk powder | 4% |
| Acid casein | 1.5% |
| Flavour composition | 1% |
| Hercofood frimulsion ®* | 0.3 % |
| Butter | 13.5% |
| Cooking salt | 1.1% |
| Water | 18.6% |

*Hercofood frimulsion is a product consisting of locust bean gum, guar gum and carrageenan.
**Green cheese is a fresh renneted curd.

All ingredients were put in a Stephan cutter and sheared therein for 25 minutes. Then the temperature was slowly raised to 85° C. This temperature was maintained for 6 minutes and subsequently the mixture was passed through a high pressure homogenizer operating at 200 bar and packed while still hot. It was stored at 5° C. for 1 week and then kept for 1 day at 20° C.

The product had a very good smooth texture and had good stability. No free oil was observed.

The dispersion was used for preparing croissants. Good product with a cheese taste was obtained.

Results of analyses of the product are shown in Table IV.

Example 27

Example 26 was repeated except that the following composition was used.

| | |
|---|---|
| Jong belegen Gouda cheese | 8.3% |
| Extra belegen Gouda cheese | 16.7% |
| Lactic casein | 1.3% |
| Stabilised egg yolk | 1.7% |
| Skimmilk powder | 3.3% |
| Whey protein concentrate (80%) | 2.9% |
| Green cheese prepared from UF retentate | 20.8% |
| Butterfat | 24.2% |
| Cooking salt | 1.2% |
| Flavour composition | 1.7% |
| Hercofood frimulsion ® | 0.2% |
| Water | 17.7% |

The lamination dispersion had a very smooth texture and good stability. See also Table IV.

The dispersion was used for preparing puff pastries. Very satisfactory results were obtained.

Example 28

Example 27 was repeated but sunflower oil was used instead of butterfat. The lamination dispersion was somewhat softer, but the dough preparation presented no problems and good pastries were again obtained.

Example 29

A lamination dispersion was prepared as in example 26 except that the following ingredients were used:

| | |
|---|---|
| Jong belegen Gouda cheese | 25% |
| Extra belegen Gouda cheese | 25% |
| Fresh cheese | 20% |
| Whey protein concentrate (80%) | 3% |
| Green cheese from UF retentate | 15% |
| Butterfat | 4% |
| Hercofood frimulsion ® | 0.25% |
| Water | 7.75% |

The lamination dispersion was used for preparing croissants and puff pastry as described in examples 7–17 and 1–4 respectively. The lamination performance was excellent, the product was very plastic. Also the baked products were good and had especially good taste and flavour. See also Table IV.

TABLE IV

| Example | 26 | 27/28 | 29 |
|---|---|---|---|
| Water (%) | 43 | 38 | 46 |
| Protein (%) | 19 | 15 | 20 |
| Fat (%) | 29 | 39 | 28 |
| Lactose (%) | 2 | 2 | 0.5 |

Comparative example H

This trial was done to evaluate the teaching of WO 94/26741.
Composition used:
27.4% butter
46.8% Paselli SA2 (DE2)
6.1% Avebe Md 20 (DE20)
8.1% Instant clear gel (pre-gelatinized starch)
0.5% Whey protein
0.2% Xanthan gum
10.9% Water The butter was creamed at ambient temperature in a Kenwood mixer operating at lowest stirring speed. Gradually the dry ingredients and the water were added to the butter while stirring. The mixer was covered to prevent excessive dusting. Mixing was continued for another 3 minutes at higher speed.

During addition of the mix of dry ingredients initially a homogeneous mass with butter was formed, which changed into a crumbly incoherent material when all the ingredients were added. The water added could not correct this.

Also with further kneading by hand a coherent material could not be formed that could usefully have been evaluated for preparing laminated dough.

Comparative example I

This trial was done to evaluate the teaching of U.S. Pat. No. 4,752,494.
The following composition was used;
12.5% water
66.7% cornsyrup DE 42
2.47% hydrocolloid Avicel PC 591
6.25% polydextrin ex Physer
3.78% maltodextrin Paselli MD10
2.6% Na caseinate
2.6% Modified whey solids
3.1% salt Half of the cornsyrup was dispersed in the water, the Avicel was added and the composition was vigorously mixed for 10 minutes. The remaining ingredients were added and the composition was mixed for 5 minutes. It was then heated to 100° C. kept at that temperature for 10 minutes and allowed to cool down.

The resulting product had a soft creamy texture consistent with exception based on the description of U.S. Pat. No. 4,752,494. It appeared that it might be a suitable base for preparing a creme filling. However it was much too soft for use as a lamination dispersion in the preparation of laminated dough. A meaningful reading could not be obtained in the Stevens measurement using the normal probe with a diameter of 4.4 mm. Therefore, the Stevens value was measured using a probe with 12.7 mm diameter. Even with this probe, the Stevens value at 20° C. was only 12 g. At 5° C. it was 16 g.

What is claimed is:

1. An edible lamination dispersion, comprising:
   a) a continuous aqueous phase;
   b) 15 to 90 wt. % water;
   c) 10 to 50 wt. % fat;
   d) 3 to 25 wt. % non-gelling protein hydrocolloid, calculated on a non-fat contents of the dispersion;
   e) 0.1 to 60 wt. % of a material selected from the group consisting of non-protein hydrocolloid and gelatin, calculated on the non-fat contents of the dispersion.

2. The lamination dispersion of claim 1, wherein the dispersion comprises 20 to 80 wt. % water.

3. The lamination dispersion of claim 1, wherein the non-gelling protein hydrocolloid is selected from the group consisting of substantially undenatured globular proteins, milk proteins and proteins derived from milk proteins.

4. The lamination dispersion of claim 1, wherein the non-gelling protein hydrocolloid selected from the group consisting of non-gelling milk casein and proteins derived from milk casein.

5. The lamination dispersion of claim 1, wherein the non-gelling protein hydrocolloid is sodium caseinate.

6. The lamination dispersion of claim 1, wherein the non-gelling protein hydrocolloid is a substantially undenatured global protein and the undenatured globular protein is present in an amount of 5 to 20 wt. %, calculated on the non-fat contents of the dispersion.

7. The lamination dispersion of claim 1, wherein the non-protein hydrocolloids are selected from the group consisting of starch-based hydrocolloids and gum-thickening agents.

8. The lamination dispersion of claim 1, wherein the non-protein hydrocolloid is maltodextrin and the maltodextrin is present in an amount of 20 to 50 wt. %, calculated on the non-fat contents of the dispersion.

9. The lamination dispersion of claim 1, wherein the non-protein hydrocolloid is polyfructose and the polyfructose is present in an amount of 25 to 55 wt. %, calculated on the non-fat contents of the dispersion.

10. The lamination dispersion of claim 1, wherein the non-protein hydrocolloid is a gum thickening agent and the gum thickening agent is present in an amount of 0.1 to 8 wt. % calculated on the non-fat contents of the dispersion.

11. The lamination dispersion of claim 1, further comprising a gelling protein hydrocolloid.

12. An edible laminated dough comprising a plurality of layers of a pre-dough and the lamination dispersion of claim 1.

13. The edible lamination dispersion, comprising:
   a) a continuous aqueous phase;
   b) 15 to 90 wt. % water;
   c) 10 to 50 wt. % fat;
   d) 3 to 35 wt. % non-gelling protein hydrocolloid calculated on a non-fat contents of the dispersion, the non-gelling protein hydrocolloid selected from the group consisting of milk proteins and proteins divided from milk proteins;
   e) 0.1 to 60 wt. % of a material selected from the group consisting of non-protein hydrocolloid and gelatin, calculated on the non-fat contents of the dispersion.

14. The lamination dispersion of claim 13, wherein the non-gelling protein hydrocolloid comprises 5 to 30 wt. % of the dispersion, calculated on the non-fat contents of the dispersion.

15. The lamination dispersion of claim 13, wherein the non-gelling protein hydrocolloid is selected from the group consisting of non-gelling milk casein and proteins derived from non-gelling milk casein.

16. The lamination dispersion of claim 13, wherein the non-gelling protein hydrocolloid is sodium caseinate.

17. The lamination dispersion of claim 13, wherein the non-protein hydrocolloid is a maltodextrin and the maltodextrin is present in an amount of 20 to 50 wt. % calculated on the non-fat contents of the dispersion.

18. The lamination dispersion of claim 13, wherein the non-protein hydrocolloid is polyfructose and the polyfructose is present in an amount of 25 to 55 wt. %, calculated on the non-fat content of the dispersion.

19. The lamination dispersion of claim 13, further comprising a protein hydrocolloid present as a gel.

20. An edible laminated dough comprising a plurality of layers of a pre-dough and the lamination dispersion of claim 13.

* * * * *

UNITED STATES PATENT AND TRADEMARK OFFICE
CERTIFICATE OF CORRECTION

PATENT NO. : 6,248,388 B1
DATED : June 19, 2001
INVENTOR(S) : Jacobus van Eendenburg et al.

It is certified that error appears in the above-identified patent and that said Letters Patent is hereby corrected as shown below:

Column 2,
Line 5, delete "composition" and replace it with -- compositions --.
Line 31, delete the word "laminate" and replace it with -- laminated --.

Column 5,
Line 41, insert the registered symbol after the word "Diosna" to read -- Diosna® --.

Column 6,
Line 46, insert the registered symbol after the words "Raftiline LS" to read
-- Raftiline LS® --.

Column 7,
Line 29, of the table, delete the word "polyfruotose" and replace it with --
polyfructose --.

Column 9,
Line 25, delete the numbers "45-63" and replace them with -- 45-65 -- .
Line 39, delete the plural "s" from the word "laminations" to read -- continuous lamination dispersions --.
Line 41, delete the plural "s" from the word "serves" to read -- serve as food for --.

Column 10,
Line 1, delete the word "each" and replace it with -- ease --.

Column 11,
Line 4, delete the word "hose" and replace it with -- those --.

Signed and Sealed this

Third Day of September, 2002

Attest:

JAMES E. ROGAN
Attesting Officer                 Director of the United States Patent and Trademark Office